United States Patent
Shuttleworth

[15] 3,651,944
[45] Mar. 28, 1972

[54] SEPARATION OF LIQUIDS

[72] Inventor: Frank Shuttleworth, Stevenage, England

[73] Assignee: National Research Development Corporation, London, England

[22] Filed: Feb. 19, 1970

[21] Appl. No.: 12,569

[30] Foreign Application Priority Data

Feb. 24, 1969 Great Britain..................9,850/69

[52] U.S. Cl..................210/265, 210/304, 210/311, 210/406
[51] Int. Cl..................................................B01d 17/02
[58] Field of Search...............210/23, 84, 265, 304, 311, 210/406

[56] References Cited

UNITED STATES PATENTS

| 3,469,702 | 9/1969 | Perren | 210/265 |
| 3,558,482 | 1/1971 | Young | 210/23 |
| 3,179,603 | 4/1965 | Edwards et al. | 210/23 X |
| 2,983,384 | 5/1961 | Winslow | 210/304 X |

Primary Examiner—Samih N. Zaharna
Attorney—Cushman, Darby & Cushman

[57] ABSTRACT

Apparatus for separating a liquid from a stream of another liquid which is immiscible therewith and has a different specific gravity, which apparatus comprises pump means, separator means, and means for feeding the mixture into the separator, the separator means being located on the suction side of the pump means whereby the mixture is drawn into the separator.

7 Claims, 1 Drawing Figure

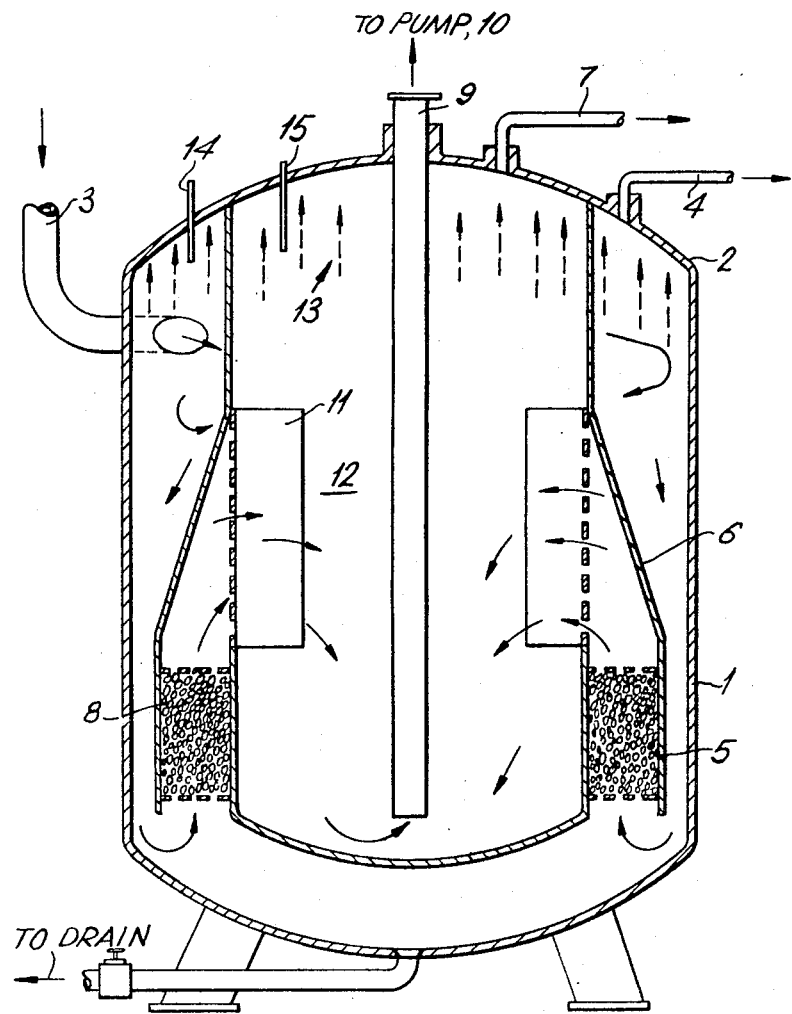

SEPARATION OF LIQUIDS

This invention relates to the separation of liquids, especially but not exclusively oil and water.

The separating apparatus and methods of separation of this invention are particularly suitable for use on board ships where the water in the ballasted fuel tanks is required to be pumped out prior to refuelling without the risk of contaminating inshore waters with waste oil.

Separators are well known wherein the oil and water mixture to be separated is pumped into a separator and separation is effected, for example, by flotation and/or filters. Experiments have shown that the pump arrangement of these known types of separators results in a considerable degree of breaking up and even emulsification of the oil and water, which increases the amount of work which the separator has to do.

According to this invention there is provided apparatus for separating a liquid from a stream of another liquid which is immiscible therewith and has a different specific gravity, which apparatus comprises pump means, separator means, and means for feeding the mixture into the separator, characterized by the separator means being located on the suction side of the pump means whereby the mixture is drawn into the separator.

Separators which include a separating filter have been found to be particularly suitable for use with this invention.

One such separating filter arrangement is that described in U.S. Pat. No. 972,286 wherein there is claimed apparatus for separating a liquid from a stream of another liquid which is immiscible therewith and has a higher specific gravity, which apparatus comprises a vessel containing a primary gravity separating zone, means for directing the liquid stream downwards from said primary separating zone and then upwards to a secondary gravity separating zone, outlets for separated liquid from the primary and secondary separating zones, means for directing the liquid stream downwards from said secondary zone, and a body of material disposed across the path of said stream between said separating zones and adapted to be penetrated by said stream and to coalesce entrained globules of the liquid to be separated.

The apparatus of the invention may be adapted to incorporate a filter comprising a bed of granules of plastics material, such as a polyolefine. The granules may be packed together in order to reduce or eliminate movement of the granules when the apparatus is subjected to some form of movement such as that experienced on board a ship at sea. The plastics material is preferably chosen to have the property of attracting particles of oil on to the surface of the granules thus facilitating the coalescing of dispersed oil particles into relatively large globules.

The invention will be more readily understood from the following description of certain embodiments thereof illustrated in the accompanying drawing which illustrates schematically one construction in accordance with the present invention.

With reference to the FIGURE, a separator in the form of a bell or casing 1 having a domed top 2 has a tangential oil contaminated water inlet 3 and constitutes a primary oil separation tank in which the larger globules are separated by flotation in the conventional manner. A primary oil outlet 4 leads from the dome 2 to an oil receptacle (not shown). The primary oil separation tank 1 is followed at a lower level by coalescing means constituted by a packed filter bed 5 of polyethylene granules enclosed in a generally conical housing 6 of which the upper part constitutes a secondary separating tank for smaller oil globules which remain entrained in the water flowing downwards from the primary separating tank 1. The polyethylene granules are substantially ovoid in shape having dimensions of approximately three-sixteenth inch by one-eighth inch. The housing 6 is shown as actually located within the tank 1, but it may, if preferred, be a separate enclosed structure below the bell or casing 1. In the bed 5 the smaller oil globules are transformed into larger globules which can be more easily separated in the housing 6 from the water by the same conventional flotation process as is operative in the primary separating tank 1. The separated oil is extracted through a secondary oil offtake 7 leading from the top of the housing 6 to the oil receptacle.

An annular clearance space 8 within the filter bed 5 is connected to a clean water outlet 9 which in turn is connected to the suction side of a pump 10, the space 8 being separated from the space above the filter bed 5 by radial flow control plates 11. The circulation of water through the apparatus is shown by the solid arrows 12 and of oil by the dotted arrows 13.

The pressure within the separator 1 is below atmospheric pressure and must be capable of drawing the oil contaminated water from storage tanks (not shown) into the separator 1 via inlet 3.

When the oil collected in the primary and secondary separating tanks exceeds a certain amount it is necessary to drain off or pump out the collected oil via outlets 4 and 7. Oil/water level sensing devices 14 and 15 sense the level of the oil and water and feed a corresponding output signal to automatically stop pump 10 or to warn an operator to stop pump 10 should the permissible amount of oil be exceeded. The collected oil can then be drained or pumped out (pump not shown) from the separating tanks 1 and 6 via the respective outlets 4 and 7.

Table 1 illustrates the improvement in separation which was obtained by the use of this invention. In arrangement A the pump was located on the inlet side of the separator shown in the FIGURE and in arrangement B the pump was located on the outlet side of the separator.

| Oil content (p.p.m.) | | Pressure within separator | Arrangement |
|---|---|---|---|
| Inlet | Effluent | | |
| 8,500 | 155 | +2% p.s.i. | A |
| 10,000 | 19 | −2 p.s.i. | B |

NOTE.—p.p.m.=parts per million.

The efficiency of oil removal may be affected by the granule size, granule shape, pressures within and across the bed, and the flow pattern through the bed. Foreign matter tends to pass through the filter bed thus reducing the likelihood of clogging.

I claim:

1. Apparatus for separating a first liquid component from a mixture of said first liquid component and a second liquid component, said second liquid component being immiscible with said first liquid component and having a different specific gravity than said first liquid component, said apparatus comprising (a) a separator vessel, (b) an inlet to said separator vessel for the mixture of said first and second liquid components, (c) separate outlets from said separator vessel for the first liquid component freed from said second liquid component and for the second liquid component, said first and second liquid components forming separate upper and lower liquid phases in said separator due to the difference in specific gravities of said first and second liquid components, (d) separate pumps for removing said first and second liquid components from said separator, (e) means for supplying said first and second liquid components from said separate outlets to the suction side of said pumps whereby said first and second liquid components are drawn from said separator vessel into said pumps by the suction head of said pumps, (f) means for supplying said mixture of said first and second liquid components to said inlet of said separator whereby said mixture of said first and second liquid components is drawn into said separator due to the withdrawal of said first and second liquid components from said separator by said pumps.

2. Apparatus according to claim 1 wherein the separator is provided with filter means.

3. Apparatus according to claim 1 wherein the separator comprises a vessel containing a primary gravity separating zone, means for directing said stream vertically from the primary separating zone, means for reversing the vertical direction of flow of the stream from the primary separating zone and directing the stream to a secondary gravity separating zone, means for directing the stream from the secondary separating zone in the opposite vertical direction to the direction in which the stream enters the secondary separating zone, outlets for separated liquid from said separating zones, and filter means disposed across the path of the stream between said separating zones and adapted to be penetrated by said stream and to coalesce entrained globules of the liquid to be separated.

4. Apparatus according to claim 2 wherein the filter means is adapted to contain a bed of granules of plastics material.

5. Apparatus according to claim 4 wherein the plastics material is a polyolefine.

6. Apparatus according to claim 4 wherein the granules are substantially ovoid in shape.

7. Apparatus according to claim 4 wherein the granules are of substantially uniform dimensions.

* * * * *